USO10741173B2

(12) United States Patent
Kline et al.

(10) Patent No.: US 10,741,173 B2
(45) Date of Patent: Aug. 11, 2020

(54) ARTIFICIAL INTELLIGENCE (AI) BASED VOICE RESPONSE SYSTEM ETIQUETTE

(71) Applicant: INTERNATIONAL BUSINESS MACHINES CORPORATION, Armonk, NY (US)

(72) Inventors: Eric V. Kline, Rochester, MN (US); Sarbajit K. Rakshit, Kolkata (IN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 140 days.

(21) Appl. No.: 16/016,906

(22) Filed: Jun. 25, 2018

(65) Prior Publication Data
US 2019/0392821 A1    Dec. 26, 2019

(51) Int. Cl.
*G10L 15/22*    (2006.01)
*G10L 15/24*    (2013.01)
*G06F 3/00*    (2006.01)
*G10L 15/18*    (2013.01)
*G06F 40/30*    (2020.01)

(52) U.S. Cl.
CPC .......... *G10L 15/1815* (2013.01); *G06F 40/30* (2020.01); *G10L 15/22* (2013.01); *G10L 2015/223* (2013.01)

(58) Field of Classification Search
CPC ............ G10L 15/22; G10L 15/24; G06F 3/00
See application file for complete search history.

(56) References Cited

U.S. PATENT DOCUMENTS

| 7,046,784 | B2 | 5/2006 | Seligmann |
| 7,991,138 | B2 | 8/2011 | Vaughn |
| 8,768,304 | B2 | 7/2014 | Son et al. |
| 8,825,584 | B1 | 9/2014 | Miller et al. |
| 9,330,567 | B2 | 5/2016 | Ricci |
| 9,531,656 | B2 | 12/2016 | Chebiyyam |
| 9,930,481 | B2 | 3/2018 | Kaplan et al. |
| 2004/0049424 | A1* | 3/2004 | Murray ................ G06Q 10/04 705/14.14 |
| 2005/0186977 | A1 | 8/2005 | Chiu et al. |

(Continued)

OTHER PUBLICATIONS

Bohus, Dan et al.; "On The Challenges and Opportunities of Physically Situated Dialog", AAAI Fall Symposium (FS-10-05), Nov. 3, 2010, pp. 2-7.

(Continued)

*Primary Examiner* — Shreyans A Patel
(74) *Attorney, Agent, or Firm* — Cantor Colburn LLP; Tihon Poltavets

(57) ABSTRACT

Example embodiments relate to, among other things, AI-based voice response systems configured to implement an etiquette protocol and methods, computer-readable media, techniques, and methodologies for implementing an etiquette protocol for AI-based voice response systems. The AI-based voice response system etiquette protocol in accordance provides a mechanism by which an AI-based voice response system can determine a current level of engagement of a user or a group of users with their environment and further determine, based on the current level of user engagement, an appropriate point in time to provide a response to a user request or prompt a user for more information in response to a user request.

20 Claims, 7 Drawing Sheets

(56) References Cited

U.S. PATENT DOCUMENTS

| | | | |
|---|---|---|---|
| 2006/0059023 A1* | 3/2006 | Mashinsky | G06Q 10/02 705/5 |
| 2007/0263805 A1 | 11/2007 | McDonald | |
| 2015/0088489 A1 | 3/2015 | Abbas | |
| 2015/0215253 A1 | 7/2015 | Vemuri et al. | |
| 2018/0005144 A1* | 1/2018 | Lo | G06Q 10/025 |
| 2018/0061393 A1 | 3/2018 | Osotio | |
| 2018/0295228 A1* | 10/2018 | Hardee | H04M 1/72572 |
| 2018/0366120 A1* | 12/2018 | Ushio | G10L 15/24 |

OTHER PUBLICATIONS

Dorneich, Michael C. et al.; "Considering Etiquette in the Design of an Adaptive System", Journal of Cognitive Engineering and Decision Making, vol. 6, No. 2, Jun. 2012, pp. 243-265.

Marti, Stefan J.W.; "Autonomous Interactive Intermediaries: Social Intelligence for Mobile Communication Agents", MIT Doctor's Thesis, May 6, 2005, pp. 1-167.

Miller, Dr. Christopher et al.; "A Computational Approach to Etiquette for Cultural Interaction Training", BRIMS in Proceedings of 16th Conference on, Mar. 26-29, 2007, pp. 1-10.

NUANCE.com "The modern approach to IVR customer self-service", retrieved at https://www.nuance.com/omni-channel-customer-engagement/voice-and-ivr/conversational-ivr.html; retrieved Mar. 24, 2020; 5 pgs.

Sadun, Erica et al. "Talking to Sid: Learning the Language of Apple's Intelligent Assistant", Abstract Only, Mar. 25, 2012; retrieved at: https://www.pearson.com/us/higher-education/product/Sadun-Talking-to-Siri-Learning-the-Language-of-Apple-s-Intelligent-Assistant/9780133056983.html; 2 pgs.

Wilson, Mark, "Why Every Gadget You Own Suddenly Wants to Talk To You", retrieved at: https://www.fastcompany.com/3055178/why-every-gadget-you-own-suddenly-wants-to-talk-to-you; dated Jan. 7, 2016; 10 pgs.

* cited by examiner

ARTIFICIAL INTELLIGENCE (AI) BASED VOICE RESPONSE SYSTEM ETIQUETTE

BACKGROUND

The present invention relates generally to AI-based voice response systems, and more particularly, to AI-based voice response system etiquette.

AI-based voice response devices capable of responding to user voice commands or requests are available from a variety of manufacturers and are becoming increasing commonplace. Such devices are generally capable of responding to user requests for information or performing basic tasks in response to user commands such as adding items to a calendar, setting alarms/timers, placing voice or video calls, or the like. More recent advancements in AI-based voice response technology include the ability to perform more complex tasks such as placing a food order, making a restaurant reservation, contacting a ride-sharing service, or the like. Existing AI-based voice response systems, however, suffer from a number of drawbacks, technical solutions to which are described herein.

SUMMARY

In one or more example embodiments, a computer-implemented method for implementing an etiquette protocol for an artificial intelligence (AI)-based voice response system that includes an AI-based back-end service and a voice response client device is disclosed. The method includes receiving, by the AI-based back-end service, a back-end request corresponding to a user request received by the voice response client device from a user. The method further includes receiving, by the AI-based back-end service, contextual data from the client device, determining, by the AI-based back-end service, a comparative priority score based at least in part on respective priorities of the contextual data and the back-end request, and determining, by the AI-based back-end service, a threshold wait time corresponding to the comparative priority score. The method additionally includes communicating, by the AI-based back-end service, the threshold wait time to the client device. The threshold wait time is a period of time that the AI-based back-end service instructs the client device to wait after receipt of the user request before providing a response to the user request.

In one or more other example embodiments, an AI-based voice response system is disclosed. The AI-based voice response system includes an AI-based back-end service and a voice response client device. The AI-based voice response system further includes at least one memory storing computer-executable instructions and at least one processor configured to access the at least one memory and execute the computer-executable instructions to perform a set of operations. The operations include receiving, by the AI-based back-end service, a back-end request corresponding to a user request received by the voice response client device from a user. The operations further include receiving, by the AI-based back-end service, contextual data from the client device, determining, by the AI-based back-end service, a comparative priority score based at least in part on respective priorities of the contextual data and the back-end request, and determining, by the AI-based back-end service, a threshold wait time corresponding to the comparative priority score. The operations additionally include communicating, by the AI-based back-end service, the threshold wait time to the client device. The threshold wait time is a period of time that the AI-based back-end service instructs the client device to wait after receipt of the user request before providing a response to the user request.

In one or more other example embodiments, a computer program product for implementing an etiquette protocol for an artificial intelligence (AI)-based voice response system that includes an AI-based back-end service and a voice response client device is disclosed. The computer program product includes a non-transitory storage medium readable by a processing circuit, the storage medium storing instructions executable by the processing circuit to cause a method to be performed. The method includes receiving, by the AI-based back-end service, a back-end request corresponding to a user request received by the voice response client device from a user. The method further includes receiving, by the AI-based back-end service, contextual data from the client device, determining, by the AI-based back-end service, a comparative priority score based at least in part on respective priorities of the contextual data and the back-end request, and determining, by the AI-based back-end service, a threshold wait time corresponding to the comparative priority score. The method additionally includes communicating, by the AI-based back-end service, the threshold wait time to the client device. The threshold wait time is a period of time that the AI-based back-end service instructs the client device to wait after receipt of the user request before providing a response to the user request.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral identifies the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

DETAILED DESCRIPTION

Figure 1:
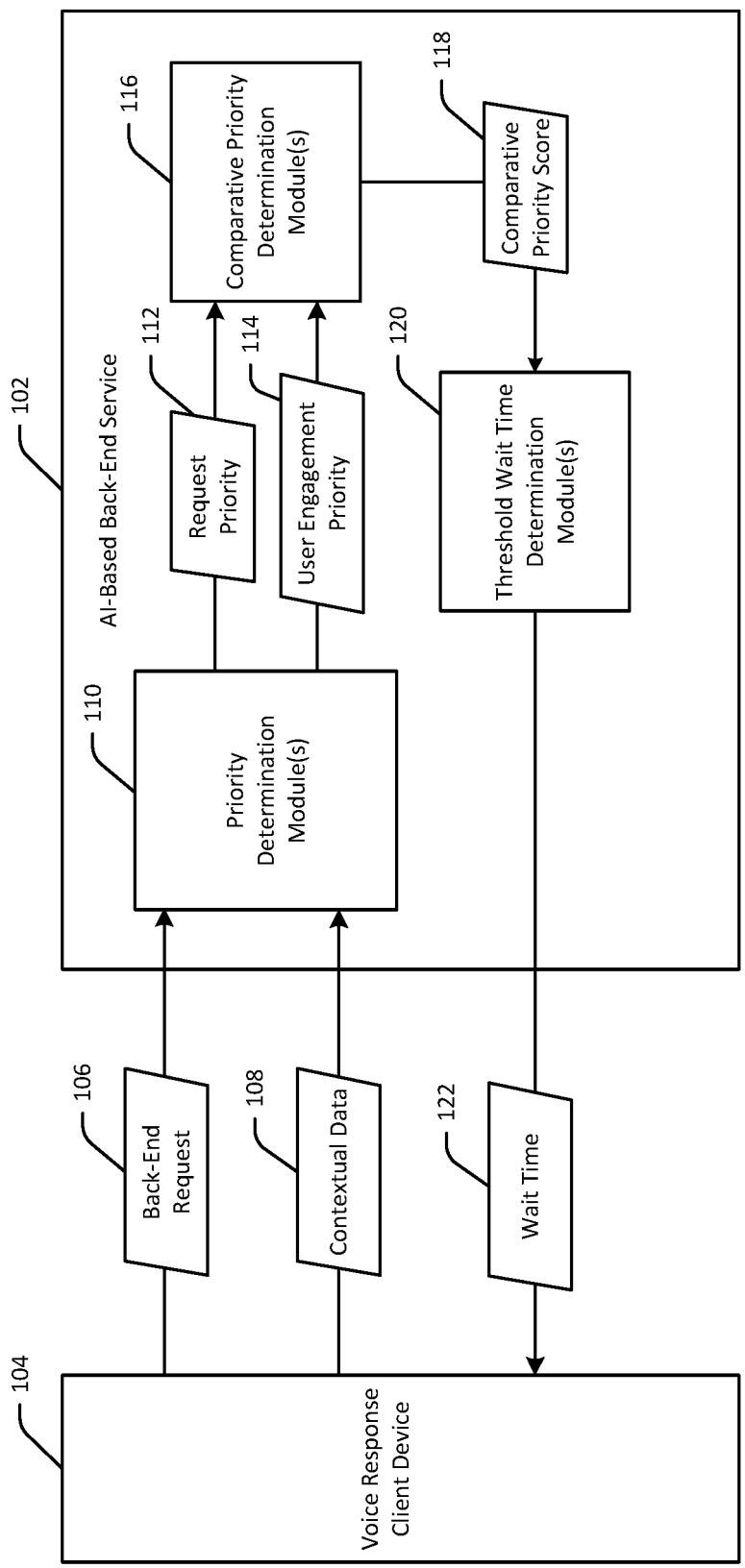
FIG. 1 is a schematic hybrid data flow/block diagram illustrating an architecture and corresponding operations performed by an AI-based back-end service and a voice response client device in accordance with one or more example embodiments.

Example embodiments relate to, among other things, AI-based voice response systems configured to implement an etiquette protocol and methods, computer-readable media, techniques, and methodologies for implementing an etiquette protocol for AI-based voice response systems. An AI-based voice response system etiquette protocol in accordance with example embodiments provides a mechanism by which an AI-based voice response system can determine a current level of engagement of a user or a group of users with their environment and further determine, based on the current level of user engagement, an appropriate point in time to provide a response to a user request or prompt a user for more information in response to a user request. Throughout this disclosure, a response to a user request may also refer to a request for additional information in response to a user request.

AI-based voice response systems may include a voice response client device configured to receive voice input from a user and provide voice output to a user. AI-based voice response systems may further include an AI-based back-end service configured to interact with the client device and receive and respond to information requests from the client device. In certain example scenarios, after providing voice input to a voice response client device (e.g., a user request for information), a user may become engaged with her environment. For example, after submitting a user request to the client device, a user may become engaged in conversation with one or more individuals physically present in her environment or via a voice or video call. As another non-limiting example, a user may become self-engaged after submitting a user request to the client device by, for instance, listening to music, reading a book or magazine, watching television, or the like.

Conventional AI-based voice response systems lack an etiquette protocol, and thus, do not account for a current level of user engagement with their environment when providing a response to a user request. For instance, conventional voice response client devices typically provide voice output corresponding to a response to a user request immediately upon receipt from a back-end service without regard for a user's current level of engagement, which may result in a disruption to the user experience. If, for example, a user is engaged in conversation or otherwise self-engaged, providing voice output in the form of a response to a previously submitted user request or a request for additional information from the user while the user is engaged with their environment may be considered an annoyance.

AI-based voice response systems in accordance with example embodiments are configured to implement an etiquette protocol that addresses at least the above-mentioned drawbacks associated with conventional AI-based voice response systems. In example embodiments, a voice response client device of an AI-based voice response system may capture contextual data relating to a user's environment. The contextual data may include, for example, sensor data received from a wearable device of a user, still image data or video data captured by one or more cameras integrally provided as part of the voice response client device or otherwise present in the user's environment, activity log information of one or more devices present in the user's environment, voice data, or the like. The contextual data may provide an indication of a current level of engagement of a user with his environment.

The voice response client device may send the contextual data to an AI-based back-end service. The back-end service may perform a comparative priority analysis between the contextual data and a user request received from the client device. More specifically, the back-end service may determine respective priorities of the user request and the current user engagement level (as gleaned from the contextual data) and calculate a comparative priority score there between. In certain example embodiments, if the comparative priority score is below a threshold value—indicating that the user's engagement level is low in relation to the user request priority—the back-end service may instruct the client device to interact with the user by providing a response to the user request. On the other hand, if the comparative priority score meets or exceeds the threshold value, the back-end service may determine a threshold wait time corresponding to the comparative priority score.

The threshold wait time may be a period of time that the AI-based back-end service instructs the client device to wait after receipt of the user request before providing a response to the user request. In certain example embodiments, the threshold wait time may be correlated to the comparative priority between the user's engagement level and the user request. For instance, a higher comparative priority score may indicate a high level of user engagement with her environment in relation to a priority of the user request, and thus, may correspond to a longer threshold wait time.

After communicating the threshold wait time to the client device, the back-end service may continue to receive updated contextual data from the client device at periodic intervals corresponding to any desirable periodicity. The updated contextual data may include any of the types of data previously described and may provide an indication of how a user's engagement level with his environment changes during the threshold wait time. In certain example embodiments, the back-end service may calculate an updated comparative priority score between the user request and the user's current engagement level based on the updated contextual data. If, for example, the user's engagement level with her environment has dropped since the user request was submitted (e.g., the user is no longer conversing with others), the newly calculated comparative priority score may fall below a threshold value, indicating that a response to the user request can be provided prior to expiration of the threshold wait time.

In certain example embodiments, even if the recalculated comparative priority score does not indicate that a response to a user request can be provided prior to expiration of the initially determined threshold wait time, alternative criteria may be met for providing the response prior to expiration of the threshold wait time. For instance, the back-end service may perform a semantic analysis of speech data that is captured by the client device and included in the updated contextual data. The speech data may include voice input corresponding to a conversation among a group of users present in the environment in which the client device is located. Based on the semantic analysis, the back-end service may determine that the users are conversing on a topic related to the user request that was previously submitted. In such an example scenario, the back-end service may determine that a response to the user request can be provided prior to expiration of the initially determined threshold wait time, in which case, the back-end service may instruct the client device to provide the response to the user request as a participant in the conversation. For instance, the client device may monitor the conversation and wait for a break or lull in the conversation prior to providing the response in a manner similar to a human participant in a conversation.

In the event that the recalculated comparative priority score does not indicate that a response to the user request can be provided prior to expiration of the initially determined threshold wait time and alternative criteria for providing the response prior to expiration of the threshold wait time are not met, the back-end service may determine an updated threshold wait time based on the updated comparative priority score. The updated threshold wait time may be longer or shorter than the initially determined threshold wait time. The back-end service may then communicate the updated threshold wait time to the client device and the process described above may continue iteratively.

If a response has not been provided to the user request upon expiration of the current threshold wait time—indicating, for example, that the user is still highly engaged with her environment—the back-end service may identify a backup user with whom to communicate. In certain example embodiments, prior to communicating with the backup user, the back-end service may determine whether an unauthorized user is present in the user's environment based on contextual data received from the client device. An unauthorized user may be an individual present in the user's environment who is not authorized to receive the response to the user request. If no unauthorized user is present, the client device may attempt to communicate with the backup user by providing the response to the user request as voice output to the backup user. In the event that the backup user is not available or if an unauthorized user is present in the environment, the back-end service may send a notification to a mobile device of the user who submitted the user request that informs the user that a response is available or that includes the response itself. In certain example embodiments, even if an unauthorized user is not present, the client device may not provide the response via voice output to the backup user, but rather may send a notification to a mobile device of the backup user so as to avoid disrupting the primary user's (the user who submitted the user request) current engagement level with his environment.

In addition, in various example embodiments, the AI-based voice response system may monitor a user's behavior, gestures, facial expressions, speech, or the like to gather historical data from the user that can be used, as part of a self-learning algorithm, to determine a user's patterns of engagement with his environment, which in turn, can be used to determine when and how to interact with the user based on different contextual situations. In this manner, the AI-based voice response system may learn a user's mannerisms over time and more effectively determine appropriate times to communicate with a user without disrupting the user's experience.

Example embodiments provide various technical features, technical effects, and improvements to computer technology. In particular, an AI-based voice response system in accordance with example embodiments is configured to implement an etiquette protocol that represents a technological improvement over conventional AI-based voice response systems. Technical features of an AI-based voice response system disclosed herein include the capability to monitor a user's engagement level with her environment by capturing contextual data that includes data captured from a variety of different sensors and the capability to perform a comparative priority analysis between a user request and the contextual data to determine a threshold wait time for providing a response to the user request. Technical features of an AI-based voice response system disclosed herein further include the capability to perform a semantic analysis of the contextual data to determine whether users are engaged in a conversation topically related to the user request and to intervene as a participant in such a conversation.

These technical features produce a technical effect of providing an AI-based voice response system that is capable of responding to user requests in accordance with an etiquette protocol that minimizes the disruption to the user experience by interacting with the user only at times when such interaction does not interfere with the user's engagement level with her environment. Thus, an AI-based voice response system configured to implement the etiquette protocol disclosed herein represents an improvement to computer technology and the functioning of a computer. In particular, the etiquette protocol disclosed herein improves the functioning of a computerized AI-based voice response system by improving the manner in which an AI-based voice response system interacts with users so as to reduce the disruption that such interaction may have to the user's engagement level with her environment.

Various illustrative methods and corresponding data structures associated therewith will now be described. It should be noted that each operation of the methods 400-500 may be performed by one or more of the program modules or the like depicted in FIG. 1 or 6, whose operation will be described in more detail hereinafter. These program modules may be implemented in any combination of hardware, software, and/or firmware. In certain example embodiments, one or more of these program modules may be implemented, at least in part, as software and/or firmware modules that include computer-executable instructions that when executed by a processing circuit cause one or more operations to be performed. A system or device described herein as being configured to implement example embodiments may include one or more processing circuits, each of which may include one or more processing units or nodes. Computer-executable instructions may include computer-executable program code that when executed by a processing unit may cause input data contained in or referenced by the computer-executable program code to be accessed and processed to yield output data.

Figure 4A:
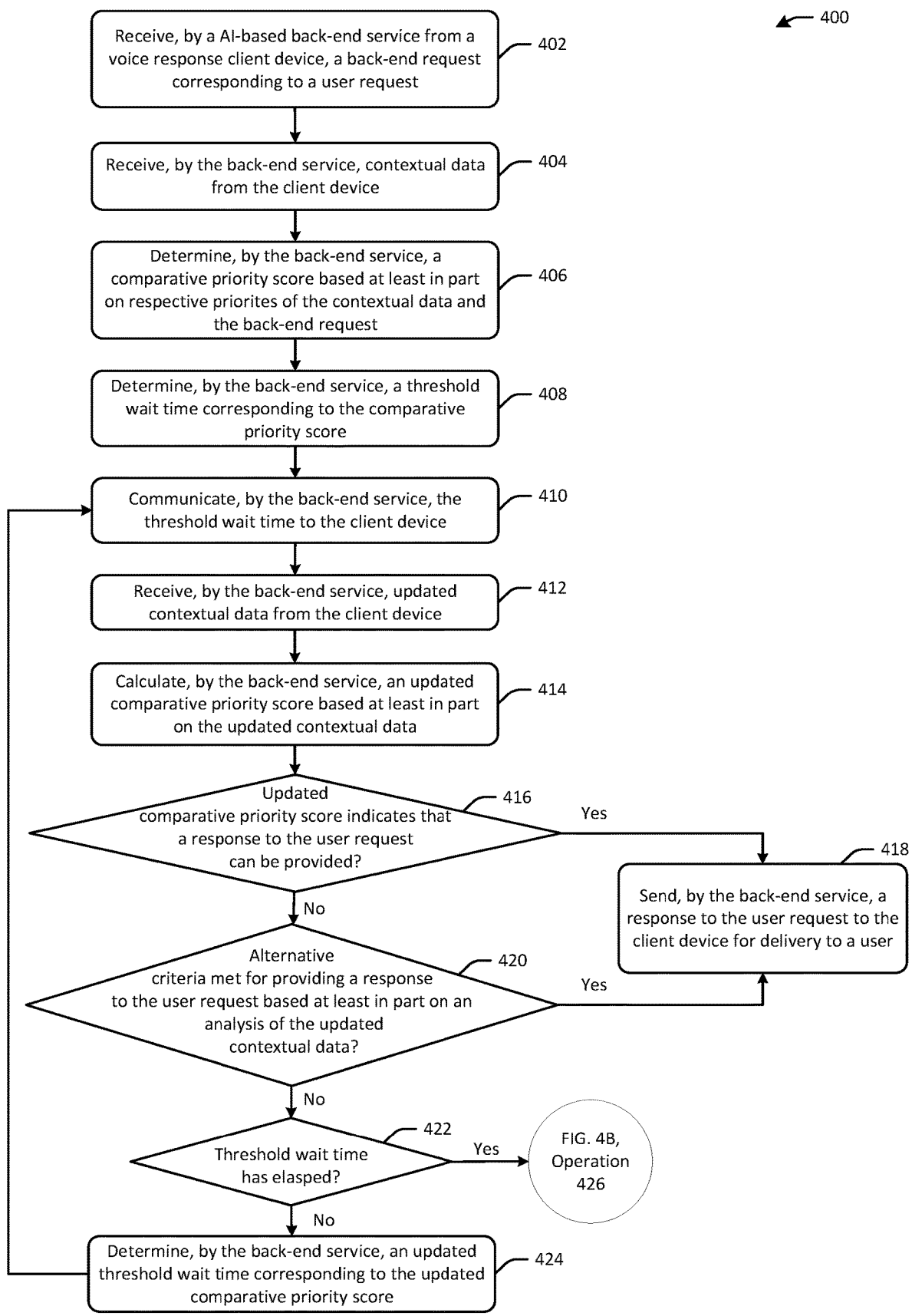
FIGS. 4A-4B are process flow diagrams depicting an illustrative method for implementing an AI-based voice response system etiquette in accordance with one or more example embodiments.
Figure 4B:
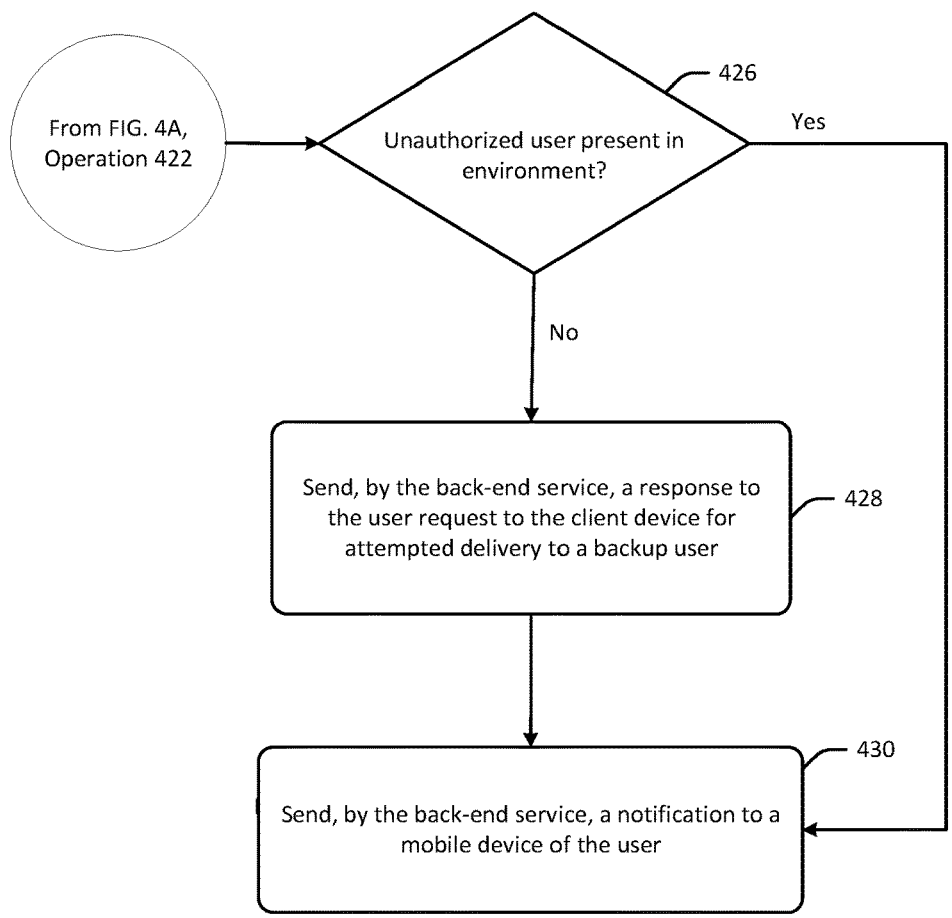
Figure 5:
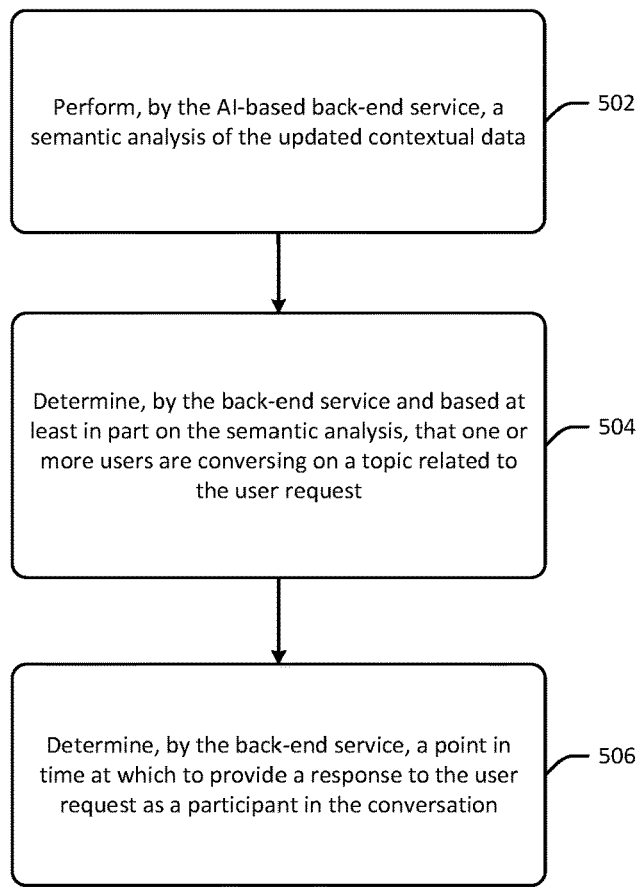
FIG. 5 is a process flow diagram of an illustrative method for determining when an AI-based voice response system may participate in a user conversation based on a semantic analysis of user speech data in accordance with one or more example embodiments.

FIG. 1 is a schematic hybrid data flow/block diagram illustrating an architecture and corresponding operations performed by an AI-based back-end service and a voice response client device in accordance with one or more example embodiments. FIGS. 4A-4B are process flow diagrams depicting an illustrative method 400 for implementing an AI-based voice response system etiquette in accordance with one or more example embodiments. FIG. 5 is a process flow diagram of an illustrative method 500 for determining when an AI-based voice response system may participate in a user conversation based on a semantic analysis of user speech data in accordance with one or more example embodiments. FIGS. 4A, 4B, and 5 will each be described in conjunction with FIG. 1 hereinafter.

Referring first to FIG. 1, an AI-based back-end service 102 and a voice response client device 104 are depicted. The back-end service 102 and the client device 104 may form part of an AI-based voice response system in accordance with example embodiments. The back-end service 102 may execute on one or more AI-based back-end servers (not depicted in FIG. 1). The voice response client device 104 may be any suitable device capable of receiving voice input and providing voice output. As such, the voice response client device 104 may include one or more microphones for capturing voice input data and one or more speakers for providing voice output. The client device 104 may also include a display for rendering image data, video data, graphics, text, or the like. In addition, the voice response client device 104 may include any of a variety of sensors such as image sensor(s), inertial sensor(s), or the like. The client device 104 may be located in an environment in which one or more users are present. While example embodiments described herein may refer to the back-end service 102 as being remotely located from the client device 104, it should be appreciated that any functionality described in connection with the back-end service 102 may reside in the client device 104 and/or another local/household device or system.

Referring now to FIG. 4A in conjunction with FIG. 1, at block 402 of the method 400, the back-end service 102 may receive a back-end request 106 from the client device 104. The back-end request 106 may correspond to a user request received by the client device 104 from a user present in an environment in which the user and the client device 104 are co-located. The user request may be provided by a user to the client device 104 in the form of voice input to the client device 104. Upon receipt of the user request, the client device 104 may generate the back-end request 106 and communicate the back-end request 106 to the back-end service 102. In certain example embodiments, the client device 104 may perform some processing on the user request to generate the back-end request 106. In other example embodiments, the client device 104 may simply forward the user request to the back-end service 102 as the back-end request 106. While the term user request is used herein, it should be appreciated that the user request may be a user command instructing the AI-based voice response system to perform a task on behalf of the user. For example, the user request may be a user command to make a restaurant reservation for a group of people.

At block 404 of the method 400, the back-end service 102 may receive contextual data 108 from the client device 104. The contextual data 108 may include, for example, sensor data received from a wearable device of the user, still image data or video data captured by one or more cameras integrally provided as part of the voice response client device 104 or otherwise present in the user's environment, activity log information of one or more devices present in the user's environment, voice data, or the like. The still image data or video data may indicate a user's current activity such as whether the user is engaged in conversation with another who is co-located or remotely located, whether the user is self-engaged (e.g., watching television, reading a book, etc.), where the user's gaze is focused, any gestures the user is making, and so forth. The activity device log data may include, for example, data indicative of a level of use of a device by a user (e.g., whether the user is actively using a device). Thus, the contextual data 108 may provide an indication of a current level of engagement of a user with his environment.

More specifically, if the user who submitted the user request is engaged in conversation with one or more other individuals present in the user's environment or one or more individuals located remotely from the user (via voice or video call), the contextual data 108 may include voice data, video data, or the like captured by a microphone or image sensor that indicates that the user is engaged in a conversation. As another non-limiting example, the contextual data 108 may include image data, video data, or the like indicating the user is self-engaged such as reading a book, listening to music, and so forth. As yet another non-limiting example, the contextual data 108 may include image data, video data, or the like indicative of a gaze direction of a user or any gestures the user is making.

At block 406 of the method 400, the back-end service 102 may determine a comparative priority score 118 based on respective priorities of the back-end request 106 and the contextual data 108. More specifically, computer-executable instructions of one or more priority determination module(s) 110 may be executed to determine a request priority 112 of the back-end request 106 (i.e., a request priority of the user request) and a user engagement priority 114 based on the contextual data 108. Any suitable metric may be used to determine the respective priorities. The request priority 112, for example, may be a metric derived based on one or more factors such as the urgency of the information requested in the user request or the urgency of the task to be completed based on the user request, the criticality of the information requested or the task to be completed, and so forth. As such, a higher request priority 112 may indicate a more urgent and/or critical back-end request 106/user request.

Similarly, the user engagement priority 114 may, for example, be a metric representative of a level of engagement of a user with his environment as determined from the contextual data 108. As with the request priority 112, a higher user engagement priority 114 may indicate that the user is more heavily engaged with his environment, and thus, more likely to be disturbed by a response to the user request. In certain example embodiments, user gestures may be identified from the contextual data 108 and analyzed as part of determining the user engagement priority 114. For example, if the contextual data 108 includes image data or video data of a user making a gesture, facial expression, or the like indicating a current desire not to interact with the AI-based voice response system, the corresponding user engagement priority 114 may be increased to reflect this.

Once determined, the request priority 112 and the user engagement priority 114 may be provided as input to one or more comparative priority determination module(s) 116. At block 406 of the method 400, computer-executable instructions of the comparative priority determination module(s) 116 may be executed to determine the comparative priority score 118 based on the request priority 112 and the user engagement priority 114. The comparative priority score 118 may be any suitable metric capable of quantifying a relative difference in priority between the request priority 112 and the user engagement priority 114. A high comparative priority score 118 (or low comparative priority score depending on the implementation) may indicate that the user engagement priority 114 is significantly higher the request priority 112, which in turn, may indicate that the user is highly engaged with her environment and the back-end request 106/user request has a relatively low urgency/criticality in relation to the user's level of engagement. Conversely, a low comparative priority score 118 (or a high comparative score depending on the implementation) may indicate that the user engagement priority 114 is significantly lower than the request priority 112, and thus, that the user engagement level is relatively low in relation to the urgency/criticality of the back-end request 106/user request.

At block 408 of the method 400, computer-executable instructions of one or more threshold wait time determination module(s) 120 may be executed to determine a threshold wait time 122 corresponding to the comparative priority score 118. As previously noted, the threshold wait time 122 may be a period of time that the AI-based back-end service 102 instructs the voice response client device 104 to wait after receipt of the user request before providing a response to the user request. At block 410 of the method 400, the back-end service 102 may communicate the wait time 122 to the client device 104. The client device 104 may then wait the threshold wait time 122 prior to providing a response to the user request (or performing some other action) absent a trigger that causes the client device 104 to provide the response to the user request prior to expiration of the wait time 122, as will be described in reference to subsequent operations of the method 400.

The method 400 depicted in FIGS. 4A-4B assumes that the voice response client device 104 will wait the threshold wait time 122 based on the comparative priority score 118 absent a trigger to provide the response to the user request prior to expiration of the threshold wait time 122. However, in certain example embodiments, the comparative priority score 118 may fall below a threshold value (or exceed a threshold value depending on the implementation), which may indicate that the user engagement priority 114 is low enough in relation to the user request priority 112 so as to obviate the need for the threshold wait time 122. In such an example scenario, where the comparative priority score 118 fails to satisfy a threshold value, the response to the user request may be provided immediately or nearly immediately upon becoming available without the voice response client device 104 having to wait the threshold wait time 122. Further, while also not depicted in FIG. 4A, in certain example embodiments, the user engagement priority 114 may be compared to a threshold value to determine whether the user engagement priority 114 rises to a level that justifies waiting the threshold wait time 122. For example, if the user engagement priority 114 is lower than a threshold value, this may indicate that the user is not engaged or only minimally engaged with her environment, in which case, the AI-based voice response system may not wait and may provide the response to the user request immediately or nearly immediately upon the response becoming available.

Referring again to FIG. 4A in conjunction with FIG. 1, after communicating the threshold wait time 122 to the client device 104, the back-end service 102 may receive updated contextual data from the client device 104 at block 412 of the method 400. The back-end service 102 may receive the updated contextual data as a continuous data stream or at periodic intervals corresponding to any desired periodicity. The updated contextual data may reflect changes over time in the level of engagement of a user with her environment. For example, if a user goes from being a more passive participant in a conversation to a more active participant, or vice versa, audio data, video data, image data, or the like included in the updated contextual data may reflect this change in user engagement with the environment. As another non-limiting example, if the user changes or ceases a self-engaged activity (e.g., user transitions from reading a book to listening to music), the updated contextual data may reflect this.

At block 414 of the method 400, the back-end service 102 may calculate an updated comparative priority score based on the updated contextual data. As part of calculating the updated comparative priority score, computer-executable instructions of the priority determination module(s) 110 may be executed to recalculate the user engagement priority 114 based on the updated contextual data, and computer-executable instructions of the comparative priority determination module(s) 116 may be executed to determine the updated comparative priority score based on the request priority 112 and the recalculated user engagement priority.

At block 416 of the method 400, computer-executable instructions of the threshold wait time determination module(s) 120 may be executed to determine whether the updated comparative priority score indicates that a response to the user request can be provided prior to expiration of the initially determined threshold wait time 122. In response to a positive determination at block 416, the back-end service 102 may send, at block 418 of the method 400, a response to the back-end request 106 to the client device 104 for immediate delivery to a user without regard for any time that may be remaining in the threshold wait time period 122. For instance, if the user was highly engaged with her environment (e.g., actively engaged in conversation) when the threshold wait time 122 was initially determined but is now only self-engaged or not engaged at all—as determined from the updated contextual data—the updated comparative priority score may be associated with a reduced threshold wait time (which may have already elapsed) or no threshold wait time at all, in which case, the response to the user request can be provided immediately or nearly immediately upon becoming available without having to wait the full initially determined threshold wait time 122.

On the other hand, if the updated contextual data indicates that the user's level of engagement has not changed very much, the recalculated comparative priority score may not differ significantly from the previously calculated comparative priority score, and thus, the threshold wait time 122 may not change significantly, in which case, a negative determination may be made at block 416. In response to a negative determination at block 416, the back-end service 102 may determine, at block 420 of the method 400, whether alternative criteria are met for providing a response to the back-end request 106/user request based on an analysis of the updated contextual data. Example alternative criteria that may be evaluated will be described in more detail in reference to FIG. 5.

In response to a positive determination at block 420, the back-end service 102 may send, at block 418 of the method 400, a response to the back-end request 106 to the client device 104 for immediate delivery to a user without regard for any time that may be remaining in the threshold wait time period 122. On the other hand, in response to a negative determination at block 420, the method 400 may proceed to block 422, where computer-executable instructions of the threshold wait time determination module(s) 120 may be executed to determine if the initially determined threshold wait time 122 has elapsed. In response to a negative determination at block 422, the method 400 may proceed to block 424, where computer-executable instructions of the threshold wait time determination module(s) 120 may be executed to determine an updated threshold wait time corresponding to the recalculated comparative priority score. The updated threshold wait time may be shorter or longer than the initially determined threshold wait time 122. However, even if the updated threshold wait time is shorter than the initially determined threshold wait time 122, there may not be a significant difference between the two because if block 424 is reached in the method 400, then the updated comparative priority score did not deviate enough from the comparative priority score 118 that was previously calculated to cause the response to the user request to be provided prior to expiration of the threshold wait time 122. From block 424, the method 400 may proceed iteratively from block 410, where the updated threshold wait time may be communicated to the client device 104.

On the other hand, in response to a positive determination at block 422 indicating that the threshold wait time 122 has elapsed without a response to the user request having been provided (which further indicates, for example, that the user is still highly engaged with her environment), the method 400 may proceed to block 426 depicted in FIG. 4B. Referring now to FIG. 4B in conjunction with FIG. 1, at block 426 of the method 400, the back-end service 102 may determine whether an unauthorized user is present in an environment in which the client device 104 and one or more other users are present. The back-end service 102 may make this determination based on the updated contextual data received from the client device 104. An unauthorized user may be an individual present in the environment of the user who submitted the user request who is not authorized to receive the response to the user request. The back-end service 102 may determine whether an unauthorized user is present using, for example, facial or gesture recognition techniques applied to the updated contextual data. For instance, each authorized user of the AI-based voice response system may be associated with a known user profile in the voice response system. If the back-end service 102 identifies a user in the environment who is not associated with a known user profile, the back-end service 102 may designate that user as an unauthorized user.

In response to a negative determination at block 426 indicating that no unauthorized user is present, the back-end service 102 may send, at block 428 of the method 400, a response to the back-end request 106/user request to the client device 104 for attempted delivery to a backup user. The back-end service 102 may identify the presence of the backup user in the environment based on the updated contextual data. In certain example embodiments, the client device 104 may attempt to communicate with the backup user by providing the response to the user request as voice output to the backup user. In the event that the backup user is not available or if an unauthorized user is present in the environment (a positive determination at block 426), the back-end service may send, at block 430 of the method 400, a notification to a mobile device of the user who submitted the user request that informs the user that a response is available or that includes the response itself.

In certain example embodiments, even if an unauthorized user is not present, the client device 104 may not provide the response via voice output to the backup user, but rather may send a notification to a mobile device of the backup user so as to avoid disrupting the primary user's (the user who submitted the user request) current engagement level with his environment. Further, in certain example embodiments, even if an unauthorized user is not present in the environment, the back-end service 102 may bypass any available backup user and simply send a notification indicative of the response to the user request to a mobile device of the user who submitted the user request. In addition, in certain example embodiments, if the back-end service 102 determines that the threshold wait time 122 is excessively long (e.g., meets or exceeds some upper threshold wait time limit), rather than have the client device 104 wait for the threshold wait time 122, the back-end service 102 may instead instruct the client device 104 to attempt—potentially well prior to expiration of the threshold wait time 122—to interact with the backup user and/or attempt to communicate the response to the user request (or an indication thereof) through alternative means to the user (e.g., send a notification to a mobile device of the user).

Figure 2:
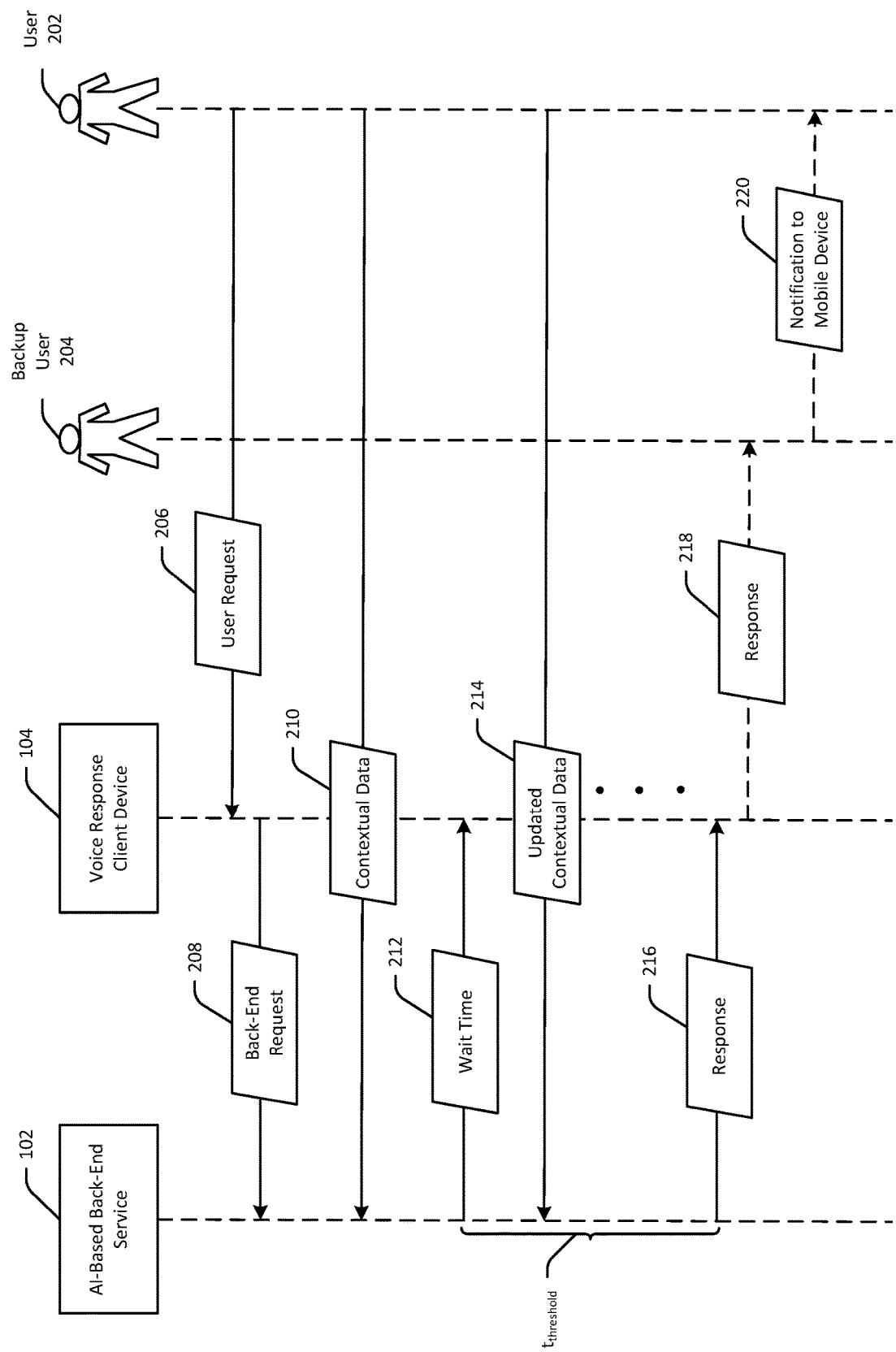
FIG. 2 is a timing diagram illustrating data flows between an AI-based back-end service, a voice response client device, and one or more users in accordance with one or more example embodiments.

FIG. 2 is a timing diagram illustrating example data flows between an AI-based back-end service, a voice response client device, and one or more users in accordance with one or more example embodiments. In particular, FIG. 2 depicts an example scenario in which the threshold wait time elapses without a response having been provided to the user request, in which case, delivery of the response to a backup user is attempted. Referring now to FIG. 2 in more detail, a user 202 may submit a user request 206 to the voice response client device 104. The user request 206 may be submitted in the form of voice input received by the client device 104. As a non-limiting example, the user request 206 may be a request/command from the user 202 to create a restaurant reservation for a group of people. The client device 104 may optionally perform some processing on the user request 206 and generate a back-end request 208 that is communicated to the AI-based back-end service 102. In some example embodiments, the client device 104 may simply forward the user request 206 to the back-end service 102 as the back-end request 208.

The client device 104 may then capture various forms of contextual data 210 and send the contextual data 210 to the back-end service 102 for analysis. As previously described, the contextual data 210 may include image data, video data, audio data, etc. indicative of a current level of engagement of the user 202 with his environment. For example, after request the restaurant reservation, the user 202 may become engaged in conversation with one or more other individuals that is critical in nature and unrelated to the user request 206. The back-end service 102 may determine a comparative priority score based on respective priorities of the user request 206 and the user's 202 level of engagement with his environment (as gleaned from the contextual data 210), and may further determine that the client device 104 should wait some period of time before providing a response to the user request 206. In particular, the back-end service 102 may determine a threshold wait time 212 corresponding to the comparative priority score and may communicate the wait time 212 to the client device 104.

As the client device 104 waits to provide a response to the user request 206 during the wait time 212, the client device 104 may continue to capture updated contextual data 214 and communicate the updated contextual data 214 to the back-end service 102. The example scenario depicted in FIG. 2 assumes that the updated contextual data 214 does not indicate a significant enough reduction in the engagement level of the user 202 with his environment to trigger providing a response to the user request 206 prior to expiration of the wait time 212. While FIG. 2 depicts the back-end service 102 as providing a response 216 to the back-end request 208 to the client device 104 at the expiration of the wait time 212, it should be appreciated that the response 216 may be received by the client device 104 from the back-end service 102 prior to expiration of the wait time 212, and the client device 104 may refrain from communicating a corresponding response 218 to the user request 206 until the wait time 212 has expired.

In an example scenario, the response 216 to the back-end request 208 and the corresponding response 218 to the user request 206 may include a request for additional information. For example, if the user request 206 is a request to create a restaurant reservation for a group of people, the response 218 may be a request for information regarding any dietary restrictions of members of the group. As another non-limiting example, the response 218 may be a request for alternative time slots that are acceptable to the user 202 if the requested time slot is not available.

At the expiration of the wait time 212, the back-end service 102 may instruct the client device 104 to attempt to send the response 218 to a backup user 204 if one is available. If an unauthorized user is not present in the environment, the client device 104 may provide the response 218 to the backup user 204 via voice output. If an unauthorized user is determined to be present in the environment, the back-end service 102 may send or may instruct the client device 104 to send a notification to a mobile device of the backup user 204 that contains or is otherwise indicative of the response 218 (e.g., a request for information regarding dietary restrictions). If delivery of the response 218 to the backup user 204 fails or the backup user 204 is unavailable or the backup user 204 is not able to provide the information requested, the back-end service 102 may send or may instruct the client device 104 to send a notification 220 to a mobile device of the user 202 that contains or is otherwise indicative of the response 218. It should be appreciated that, in certain example embodiments, regardless of whether an unauthorized user is present in the environment, the AI-based voice response system may bypass the backup user 204 (even if he/she is available) and may send the notification 220 to a mobile device of the user 202.

FIG. 5 is a process flow diagram of an illustrative method 500 for determining when an AI-based voice response system may participate in a user conversation based on a semantic analysis of user speech data in accordance with one or more example embodiments. The method 500 is illustrative of example alternative criteria that may be evaluated at block 420 of the method 400. Referring now to FIG. 5 in conjunction with FIG. 1, at block 502 of the method 500, computer-executable instructions of one or more semantic processing modules of the back-end service 102 may be executed to perform a semantic analysis of updated contextual data received from the client device 104 during the threshold wait time period 122. Performing the semantic analysis may include analyzing user speech data included in the updated contextual data to determine semantic content of the speech data such as a subject matter being discussed.

At block 504 of the method 500, computer-executable instructions of the semantic processing module(s) may be executed to determine, based at least in part on the semantic analysis performed, that one or more users in the environment are conversing on a topic that is related to the user request that was previously submitted to the client device 104. The operation at block 504 may lead to a positive determination at block 420 of the method 400, in which case, the back-end service 102 may determine, at block 506 of the method 500, an appropriate point in time at which to provide a response to the user request as a participant in the conversation.

Figure 3:
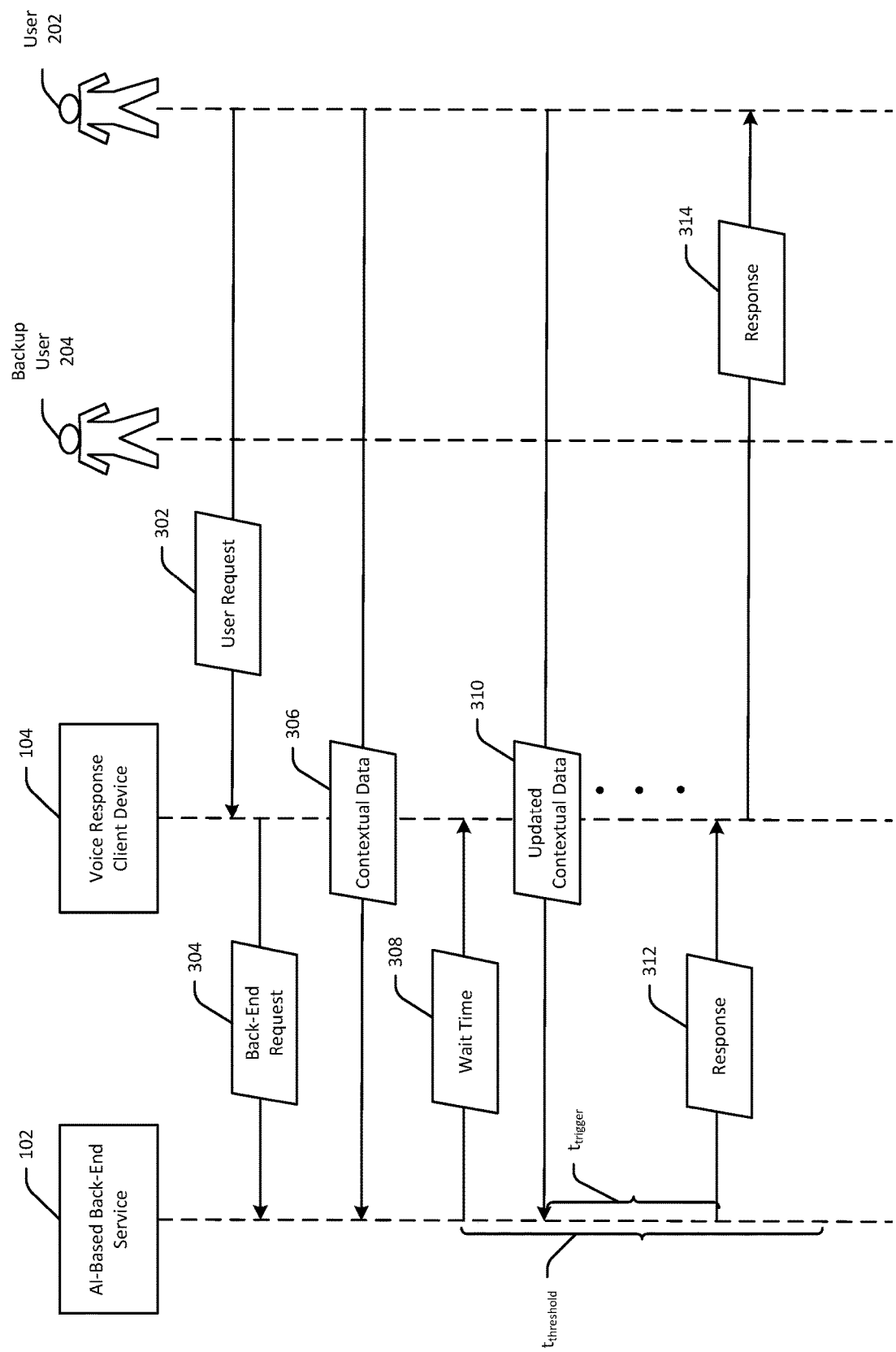
FIG. 3 is another timing diagram illustrating alternative data flows between a AI-based back-end service, a voice response client device, and one or more users in accordance with one or more example embodiments.

FIG. 3 is a timing diagram illustrating example data flows between an AI-based back-end service, a voice response client device, and one or more users in accordance with one or more example embodiments. More specifically, FIG. 3 illustrates an example scenario in which alternative criteria are met to trigger providing a response to the user request prior to expiration of an initially determined threshold wait time. Referring now to FIG. 3, the user 202 may submit a user request 302 to the client device 104. Continuing with the example introduced earlier, the user request 302 may be a request to create a restaurant reservation for a group of people. The client device 104 may optionally perform some processing on the user request 302 and generate a back-end request 304 that is communicated to the AI-based back-end service 102. In some example embodiments, the client device 104 may simply forward the user request 302 to the back-end service 102 as the back-end request 304.

The client device 104 may then capture various forms of contextual data 306 and send the contextual data 306 to the back-end service 102 for analysis. As previously described, the contextual data 306 may include image data, video data, audio data, etc. indicative of a current level of engagement of the user 202 with his environment. The back-end service 102 may determine a comparative priority score based on respective priorities of the user request 302 and the user's 202 level of engagement with his environment (as gleaned from the contextual data 306), and may further determine that the client device 104 should wait some period of time before providing a response to the user request 302. In particular, the back-end service 102 may determine a threshold wait time 308 corresponding to the comparative priority score and may communicate the wait time 308 to the client device 104.

As the client device 104 waits to provide a response to the user request 302 during the wait time 308, the client device 104 may continue to capture updated contextual data 310 and communicate the updated contextual data 310 to the back-end service 102. The back-end service 102 may perform the semantic analysis of the method 500 on user speech data included in the updated contextual data 310 and may determine that the user 202 and one or more other individuals are engaged in a conversation that is topically related to the user request 302. For instance, if the user request 302 is a request to create a restaurant reservation, the back-end service 102 may determine that the user 202 and one or more other individuals are conversing regarding the restaurant, what they may order at the restaurant, etc. In such an example scenario, the back-end service 102 may provide a response 312 to the back-end request (e.g., a request for information regarding dietary restrictions) to the client device 104, which may in turn, communicate a corresponding response 314 to the user request 302 to the user 202. More specifically, the response 314 may be communicated to the user 202 prior to expiration of the wait time 308 with the client device 104 acting as a participant in the conversation. In certain example embodiments, the client device 104 may wait for a break or lull in the conversation prior to providing the response 314 so as to mimic how a human participant would interact in the conversation.

One or more illustrative embodiments of the disclosure are described herein. Such embodiments are merely illustrative of the scope of this disclosure and are not intended to be limiting in any way. Accordingly, variations, modifications, and equivalents of embodiments disclosed herein are also within the scope of this disclosure.

Figure 6:
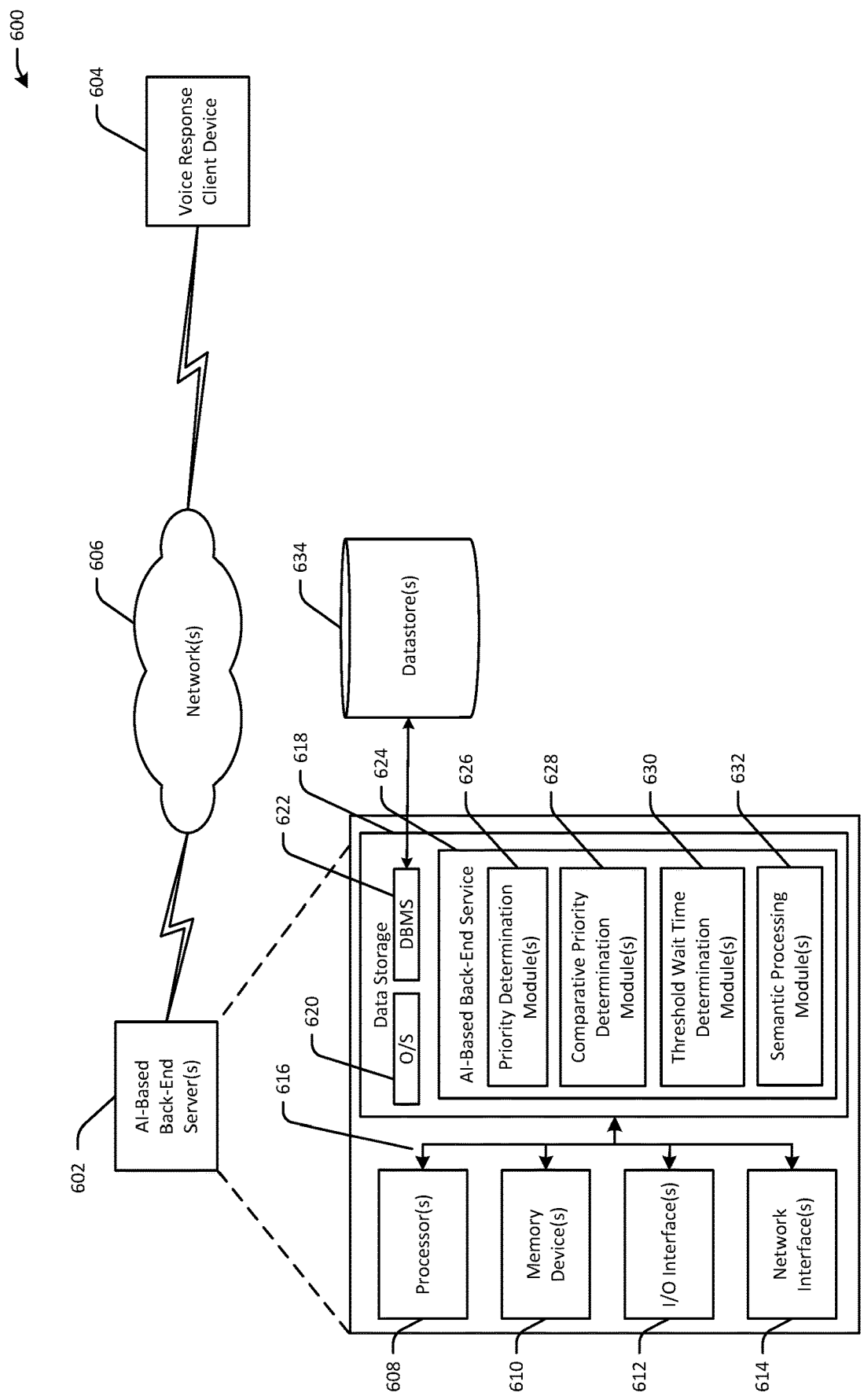
FIG. 6 is a schematic diagram of an illustrative networked architecture for an AI-based voice response system configured to implement one or more example embodiments.

FIG. 6 is a schematic diagram of an illustrative networked architecture 600 configured to implement one or more example embodiments of the disclosure. The networked architecture 600 may include one or more AI-based back-end servers 602 configured to execute an AI-based back-end service 624. The AI-based back-end server(s) 602 may be configured to communicate via one or more networks 606 with a voice response client device 604 which may be any suitable device including, without limitation, a voice-enabled device, a tablet, a smartphone, a wearable device, or the like. While any particular component of the networked architecture 600 may be described herein in the singular, it should be appreciated that multiple instances of any such component may be provided, and functionality described in connection with a particular component may be distributed across multiple ones of such a component.

The network(s) 606 may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the AI-based back-end server 602 may include one or more processors (processor(s)) 608, one or more memory devices 610 (generically referred to herein as memory 610), one or more input/output ("I/O") interface(s) 612, one or more network interfaces 614, and data storage 618. The AI-based back-end server 602 may further include one or more buses 616 that functionally couple various components of the AI-based back-end server 602.

The bus(es) 616 may include at least one of a system bus, a memory bus, an address bus, or a message bus, and may permit the exchange of information (e.g., data (including computer-executable code), signaling, etc.) between various components of the AI-based back-end server 602. The bus(es) 616 may include, without limitation, a memory bus or a memory controller, a peripheral bus, an accelerated graphics port, and so forth. The bus(es) 616 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 610 may include volatile memory (memory that maintains its state when supplied with power) such as random access memory (RAM) and/or non-volatile memory (memory that maintains its state even when not supplied with power) such as read-only memory (ROM), flash memory, ferroelectric RAM (FRAM), and so forth. Persistent data storage, as that term is used herein, may include non-volatile memory. In certain example embodiments, volatile memory may enable faster read/write access than non-volatile memory. However, in certain other example embodiments, certain types of non-volatile memory (e.g., FRAM) may enable faster read/write access than certain types of volatile memory.

In various implementations, the memory 610 may include multiple different types of memory such as various types of static random access memory (SRAM), various types of dynamic random access memory (DRAM), various types of unalterable ROM, and/or writeable variants of ROM such as electrically erasable programmable read-only memory (EE-PROM), flash memory, and so forth. The memory 610 may include main memory as well as various forms of cache memory such as instruction cache(s), data cache(s), translation lookaside buffer(s) (TLBs), and so forth. Further, cache memory such as a data cache may be a multi-level cache organized as a hierarchy of one or more cache levels (L1, L2, etc.).

The data storage 618 may include removable storage and/or non-removable storage including, but not limited to, magnetic storage, optical disk storage, and/or tape storage. The data storage 618 may provide non-volatile storage of computer-executable instructions and other data. The memory 610 and the data storage 618, removable and/or non-removable, are examples of computer-readable storage media (CRSM) as that term is used herein.

The data storage 618 may store computer-executable code, instructions, or the like that may be loadable into the memory 610 and executable by the processor(s) 608 to cause the processor(s) 608 to perform or initiate various operations. The data storage 618 may additionally store data that may be copied to memory 610 for use by the processor(s) 608 during the execution of the computer-executable instructions. Moreover, output data generated as a result of execution of the computer-executable instructions by the processor(s) 608 may be stored initially in memory 610 and may ultimately be copied to data storage 618 for non-volatile storage.

More specifically, the data storage 618 may store one or more operating systems (O/S) 620; one or more database management systems (DBMS) 622 configured to access the memory 610 and/or one or more external datastores 634; and one or more program modules, applications, engines, managers, computer-executable code, scripts, or the like such as, for example, one or more priority determination modules 626, one or more comparative priority determination modules 628, one or more threshold wait time determination modules 630, and one or more semantic processing modules 632. Each of the aforementioned modules may form part of the AI-based back-end service 624. Any of the components depicted as being stored in data storage 618 may include any combination of software, firmware, and/or hardware. The software and/or firmware may include computer-executable instructions (e.g., computer-executable program code) that may be loaded into the memory 610 for execution by one or more of the processor(s) 608 to perform any of the operations described earlier in connection with correspondingly named modules/services.

Although not depicted in FIG. 6, the data storage 618 may further store various types of data utilized by components of the AI-based back-end server 602 (e.g., data stored in the datastore(s) 634). Any data stored in the data storage 618 may be loaded into the memory 610 for use by the processor(s) 608 in executing computer-executable instructions. In addition, any data stored in the data storage 618 may potentially be stored in the external datastore(s) 634 and may be accessed via the DBMS 622 and loaded in the memory 610 for use by the processor(s) 608 in executing computer-executable instructions.

The processor(s) 608 may be configured to access the memory 610 and execute computer-executable instructions loaded therein. For example, the processor(s) 608 may be configured to execute computer-executable instructions of the various program modules, applications, engines, managers, or the like of the AI-based back-end server 602 to cause or facilitate various operations to be performed in accordance with one or more embodiments of the disclosure. The processor(s) 608 may include any suitable processing unit capable of accepting data as input, processing the input data in accordance with stored computer-executable instructions, and generating output data. The processor(s) 608 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 608 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 608 may be capable of supporting any of a variety of instruction sets.

Referring now to other illustrative components depicted as being stored in the data storage 618, the O/S 620 may be loaded from the data storage 618 into the memory 610 and may provide an interface between other application software executing on the AI-based back-end server 602 and hardware resources of the AI-based back-end server 602. More specifically, the O/S 620 may include a set of computer-executable instructions for managing hardware resources of the AI-based back-end server 602 and for providing common services to other application programs. In certain example embodiments, the O/S 620 may include or otherwise control the execution of one or more of the program modules, engines, managers, or the like depicted as being stored in the data storage 618. The O/S 620 may include any operating system now known or which may be developed in the future including, but not limited to, any server operating system, any mainframe operating system, or any other proprietary or non-proprietary operating system.

The DBMS 622 may be loaded into the memory 610 and may support functionality for accessing, retrieving, storing, and/or manipulating data stored in the memory 610, data stored in the data storage 618, and/or data stored in external datastore(s) 634. The DBMS 622 may use any of a variety of database models (e.g., relational model, object model, etc.) and may support any of a variety of query languages. The DBMS 622 may access data represented in one or more data schemas and stored in any suitable data repository. Data stored in the datastore(s) 634 may include, for example, user request data, contextual data, priority values, comparative priority scores, threshold values, threshold wait times, and so forth. External datastore(s) 634 that may be accessible by the AI-based back-end server 602 via the DBMS 622 may include, but are not limited to, databases (e.g., relational, object-oriented, etc.), file systems, flat files, distributed datastores in which data is stored on more than one node of a computer network, peer-to-peer network datastores, or the like.

Referring now to other illustrative components of the AI-based back-end server 602, the input/output (I/O) interface(s) 612 may facilitate the receipt of input information by the AI-based back-end server 602 from one or more I/O devices as well as the output of information from the AI-based back-end server 602 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the AI-based back-end server 602 or may be separate. The I/O devices may further include, for example, any number of peripheral devices such as data storage devices, printing devices, and so forth.

The I/O interface(s) 612 may also include an interface for an external peripheral device connection such as universal serial bus (USB), FireWire, Thunderbolt, Ethernet port or other connection protocol that may connect to one or more networks. The I/O interface(s) 612 may also include a connection to one or more antennas to connect to one or more networks via a wireless local area network (WLAN) (such as Wi-Fi) radio, Bluetooth, and/or a wireless network radio, such as a radio capable of communication with a wireless communication network such as a Long Term Evolution (LTE) network, WiMAX network, 3G network, etc.

The AI-based back-end server 602 may further include one or more network interfaces 614 via which the AI-based back-end server 602 may communicate with any of a variety of other systems, platforms, networks, devices, and so forth. The network interface(s) 614 may enable communication, for example, with one or more other devices via one or more of the network(s).

It should be appreciated that the program modules depicted in FIG. 6 as being stored in the data storage 618 are merely illustrative and not exhaustive and that processing described as being supported by any particular module may alternatively be distributed across multiple modules, engines, or the like, or performed by a different module, engine, or the like. In addition, various program module(s), script(s), plug-in(s), Application Programming Interface(s) (API(s)), or any other suitable computer-executable code hosted locally on the AI-based back-end server 602 and/or other computing devices accessible via one or more networks, may be provided to support functionality provided by the modules depicted in FIG. 6 and/or additional or alternate functionality. Further, functionality may be modularized in any suitable manner such that processing described as being performed by a particular module may be performed by a collection of any number of program modules, or functionality described as being supported by any particular module may be supported, at least in part, by another module. In addition, program modules that support the functionality described herein may be executable across any number of cluster members in accordance with any suitable computing model such as, for example, a client-server model, a peer-to-peer model, and so forth. In addition, any of the functionality described as being supported by any of the modules depicted in FIG. 6 may be implemented, at least partially, in hardware and/or firmware across any number of devices.

It should further be appreciated that the AI-based back-end server 602 may include alternate and/or additional hardware, software, or firmware components beyond those described or depicted without departing from the scope of the disclosure. More particularly, it should be appreciated that software, firmware, or hardware components depicted as forming part of the AI-based back-end server 602 are merely illustrative and that some components may not be present or additional components may be provided in various embodiments. While various illustrative modules have been depicted and described as software modules stored in data storage 618, it should be appreciated that functionality described as being supported by the modules may be enabled by any combination of hardware, software, and/or firmware. It should further be appreciated that each of the above-mentioned modules may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other modules. Further, one or more depicted modules may not be present in certain embodiments, while in other embodiments, additional program modules and/or engines not depicted may be present and may support at least a portion of the described functionality and/or additional functionality.

One or more operations of any of the methods 400-500 may be performed by a AI-based back-end server 602 having the illustrative configuration depicted in FIG. 6, or more specifically, by one or more program modules, engines, applications, or the like executable on such a device, potentially working in conjunction with the voice response client device 604. It should be appreciated, however, that such operations may be implemented in connection with numerous other device configurations.

The operations described and depicted in the illustrative methods of FIGS. 4A, 4B, and 5 may be carried out or performed in any suitable order as desired in various example embodiments of the disclosure. Additionally, in certain example embodiments, at least a portion of the operations may be carried out in parallel. Furthermore, in certain example embodiments, less, more, or different operations than those depicted in FIGS. 4A, 4B, and 5 may be performed.

Although specific embodiments of the disclosure have been described, one of ordinary skill in the art will recognize that numerous other modifications and alternative embodiments are within the scope of the disclosure. For example, any of the functionality and/or processing capabilities described with respect to a particular system, system component, device, or device component may be performed by any other system, device, or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure. In addition, it should be appreciated that any operation, element, component, data, or the like described herein as being based on another operation, element, component, data, or the like may be additionally based on one or more other operations, elements, components, data, or the like. Accordingly, the phrase "based on," or variants thereof, should be interpreted as "based at least in part on."

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method for implementing an etiquette protocol for an artificial intelligence (AI)-based voice response system, the AI-based voice response system including an AI-based back-end service and a client device having voice response capability, the method comprising:
   receiving, by the AI-based back-end service, a back-end request corresponding to a user request received by the client device from a user;
   receiving, by the AI-based back-end service, contextual data from the client device;
   determining, by the AI-based back-end service, a comparative priority score based at least in part on respective priorities of the contextual data and the back-end request;
   determining, by the AI-based back-end service, a threshold wait time corresponding to the comparative priority score; and
   communicating, by the AI-based back-end service, the threshold wait time to the client device.

2. The computer-implemented method of claim 1, wherein the threshold wait time is a period of time that the AI-based back-end service instructs the client device to wait after receipt of the user request before providing a response to the user request.

3. The computer-implemented method of claim 1, further comprising:
   receiving, by the AI-based back-end service, updated contextual data from the client device;
   determining, by the AI-based back-end service that the threshold wait time has elapsed;
   determining, by the AI-based back-end service, that an unauthorized person is not present in an environment associated with the client device;
   identifying, by the AI-based back-end service, a backup user in the environment; and
   communicating, by the AI-based back-end service, a response to the user request to the client device for delivery to the backup user.

4. The computer-implemented method of claim 1, further comprising:
   receiving, by the AI-based back-end service, updated contextual data from the client device;
   determining, by the AI-based back-end service that the threshold wait time has elapsed;
   determining, by the AI-based back-end service, that an unauthorized person is present in an environment associated with the client device; and
   sending, by the AI-based back-end service, a notification to a mobile device of the user, the notification including a response to the user request.

5. The computer-implemented method of claim 1, further comprising:
   receiving, by the AI-based back-end service, updated contextual data from the client device, wherein the updated contextual data indicates a change in a user engagement level associated with the user;
   determining, by the AI-based back-end service, an updated comparative priority score based at least in part on the updated contextual data;
   determining, by the AI-based back-end service and based at least in part on the updated comparative priority score, that a response to the user request can be provided prior to the threshold wait time elapsing; and
   communicating, by the AI-based back-end service, a response to the user request to the client device for delivery to the user prior to the threshold wait time elapsing.

6. The computer-implemented method of claim 1, further comprising:
   receiving, by the AI-based back-end service, updated contextual data from the client device, wherein the updated contextual data includes speech data of at least the user;
   performing, by the AI-based back-end service, a semantic analysis of the speech data;
   determining, by the AI-based back-end service, that the user is engaged in a conversation that is topically related to the user request based at least in part on the semantic analysis;
   determining, by the AI-based back-end service, a point in time prior to expiration of the threshold wait time, at which to provide a response to the user request as a participant in the conversation; and
   communicating, by the AI-based back-end service, the response to the user request to the client device for delivery to the user at the point in time prior to expiration of the threshold wait time.

7. The computer-implemented method of claim 1, wherein the contextual data comprises at least one of voice data, image data, or video data.

8. An artificial intelligence (AI)-based voice response system comprising:
- at least one memory storing computer-executable instructions; and
- at least one processor, wherein the at least one processor is configured to access the at least one memory and execute the computer-executable instructions to:
  - receive, by a back-end service of the AI-based voice response system, a back-end request corresponding to a user request received from a user by a client device of the AI-based voice response system having voice response capability;
  - receive, by the AI-based back-end service, contextual data from the client device;
  - determine, by the AI-based back-end service, a comparative priority score based at least in part on respective priorities of the contextual data and the back-end request;
  - determine, by the AI-based back-end service, a threshold wait time corresponding to the comparative priority score; and
  - communicate, by the AI-based back-end service, the threshold wait time to the client device.

9. The AI-based voice response system of claim 8, wherein the threshold wait time is a period of time that the AI-based back-end service instructs the client device to wait after receipt of the user request before providing a response to the user request.

10. The AI-based voice response system of claim 8, wherein the at least one processor is further configured to execute the computer-executable instructions to:
- receive, by the AI-based back-end service, updated contextual data from the client device;
- determine, by the AI-based back-end service that the threshold wait time has elapsed;
- determine, by the AI-based back-end service, that an unauthorized person is not present in an environment associated with the client device;
- identify, by the AI-based back-end service, a backup user in the environment; and
- communicate, by the AI-based back-end service, a response to the user request to the client device for delivery to the backup user.

11. The AI-based voice response system of claim 8, wherein the at least one processor is further configured to execute the computer-executable instructions to:
- receive, by the AI-based back-end service, updated contextual data from the client device;
- determine, by the AI-based back-end service that the threshold wait time has elapsed;
- determine, by the AI-based back-end service, that an unauthorized person is present in an environment associated with the client device; and
- send, by the AI-based back-end service, a notification to a mobile device of the user, the notification including a response to the user request.

12. The AI-based voice response system of claim 8, wherein the at least one processor is further configured to execute the computer-executable instructions to:
- receive, by the AI-based back-end service, updated contextual data from the client device, wherein the updated contextual data indicates a change in a user engagement level associated with the user;
- determine, by the AI-based back-end service, an updated comparative priority score based at least in part on the updated contextual data;
- determine, by the AI-based back-end service and based at least in part on the updated comparative priority score, that a response to the user request can be provided prior to the threshold wait time elapsing; and
- communicate, by the AI-based back-end service, a response to the user request to the client device for delivery to the user prior to the threshold wait time elapsing.

13. The AI-based voice response system of claim 8, wherein the at least one processor is further configured to execute the computer-executable instructions to:
- receive, by the AI-based back-end service, updated contextual data from the client device, wherein the updated contextual data includes speech data of at least the user;
- perform, by the AI-based back-end service, a semantic analysis of the speech data;
- determine, by the AI-based back-end service, that the user is engaged in a conversation that is topically related to the user request based at least in part on the semantic analysis;
- determine, by the AI-based back-end service, a point in time prior to expiration of the threshold wait time, at which to provide a response to the user request as a participant in the conversation; and
- communicate, by the AI-based back-end service, the response to the user request to the client device for delivery to the user at the point in time prior to expiration of the threshold wait time.

14. The AI-based voice response system of claim 8, wherein the contextual data comprises at least one of voice data, image data, or video data.

15. A computer program product for implementing an etiquette protocol for an artificial intelligence (AI)-based voice response system comprising an AI-based back-end service and a client device having voice response capability, the computer program product comprising a storage medium readable by a processing circuit, the storage medium storing instructions executable by the processing circuit to cause a method to be performed, the method comprising:
- receiving, by the AI-based back-end service, a back-end request corresponding to a user request received by the client device from a user;
- receiving, by the AI-based back-end service, contextual data from the client device;
- determining, by the AI-based back-end service, a comparative priority score based at least in part on respective priorities of the contextual data and the back-end request;
- determining, by the AI-based back-end service, a threshold wait time corresponding to the comparative priority score; and
- communicating, by the AI-based back-end service, the threshold wait time to the client device.

16. The computer program product of claim 15, wherein the threshold wait time is a period of time that the AI-based back-end service instructs the client device to wait after receipt of the user request before providing a response to the user request.

17. The computer program product of claim 15, the method further comprising:
- receiving, by the AI-based back-end service, updated contextual data from the client device;
- determining, by the AI-based back-end service that the threshold wait time has elapsed;
- determining, by the AI-based back-end service, that an unauthorized person is not present in an environment associated with the client device;

identifying, by the AI-based back-end service, a backup user in the environment; and communicating, by the AI-based back-end service, a response to the user request to the client device for delivery to the backup user.

18. The computer program product of claim 15, the method further comprising:

receiving, by the AI-based back-end service, updated contextual data from the client device;

determining, by the AI-based back-end service that the threshold wait time has elapsed;

determining, by the AI-based back-end service, that an unauthorized person is present in an environment associated with the client device; and sending, by the AI-based back-end service, a notification to a mobile device of the user, the notification including a response to the user request.

19. The computer program product of claim 15, the method further comprising:

receiving, by the AI-based back-end service, updated contextual data from the client device, wherein the updated contextual data indicates a change in a user engagement level associated with the user;

determining, by the AI-based back-end service, an updated comparative priority score based at least in part on the updated contextual data;

determining, by the AI-based back-end service and based at least in part on the updated comparative priority score, that a response to the user request can be provided prior to the threshold wait time elapsing; and communicating, by the AI-based back-end service, a response to the user request to the client device for delivery to the user prior to the threshold wait time elapsing.

20. The computer program product of claim 15, the method further comprising:

receiving, by the AI-based back-end service, updated contextual data from the client device, wherein the updated contextual data includes speech data of at least the user;

performing, by the AI-based back-end service, a semantic analysis of the speech data;

determining, by the AI-based back-end service, that the user is engaged in a conversation that is topically related to the user request based at least in part on the semantic analysis;

determining, by the AI-based back-end service, a point in time prior to expiration of the threshold wait time, at which to provide a response to the user request as a participant in the conversation; and communicating, by the AI-based back-end service, the response to the user request to the client device for delivery to the user at the point in time prior to expiration of the threshold wait time.

* * * * *